March 16, 1926.
F. KNEIFEL
MEAT TENDERER
Filed Nov. 18, 1925
1,577,036
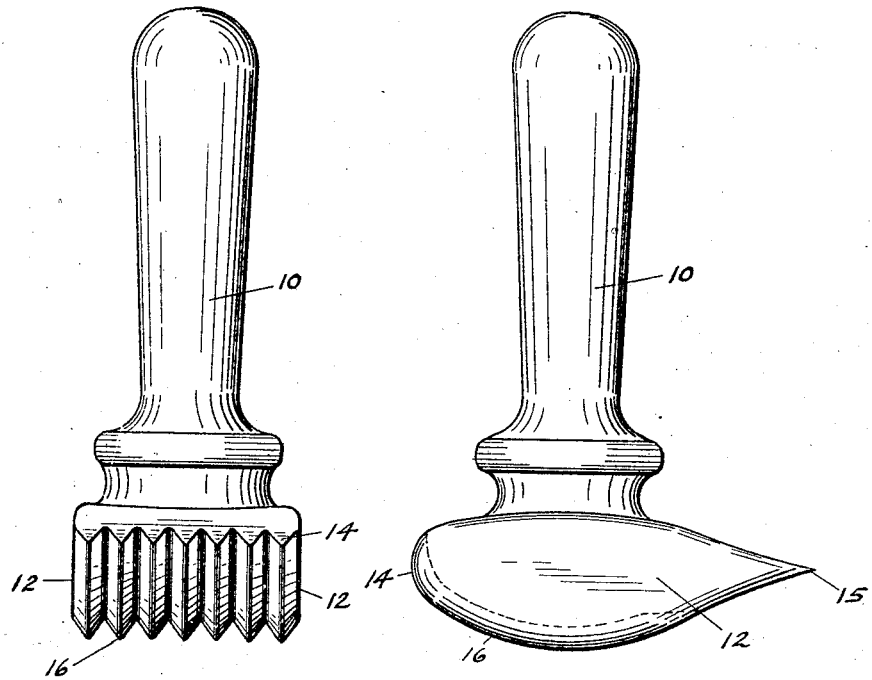
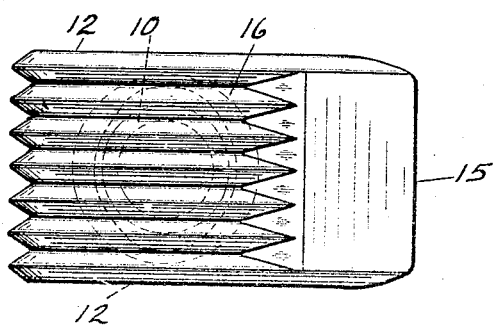
INVENTOR.
FRED KNEIFEL
BY
ATTORNEY.

Patented Mar. 16, 1926.

1,577,036

UNITED STATES PATENT OFFICE.

FRED KNEIFEL, OF BARBERTON, OHIO.

MEAT TENDERER.

Application filed November 18, 1925. Serial No. 69,758.

*To all whom it may concern:*

Be it known that I, FRED KNEIFEL, a citizen of the United States, and a resident of Barberton, county of Summit, and State of Ohio, have invented certain new and useful Improvements in Meat Tenderers, of which the following is a specification.

This invention relates to devices for use in tendering meats, the objects of the invention being to improve upon prior forms of devices for this purpose in points of simplicity and efficiency. A further object of the invention is to make a device of this type which is sanitary and easily cleaned. The device also provides means for getting at all parts of the steak or other meat which is being treated.

In the drawings is shown one form or embodiment of the device, in which—

Figure 1 is a side view;

Figure 2 is a further side view taken at right angles to Figure 1; and

Figure 3 is a view looking at the bottom of the device.

The device of the present invention is made of steel or iron in a single, one piece casting, thereby avoiding the use of wooden handles which come out frequently and are liable to retain fragments of meat. This also increases the weight of the device and makes it more effective for that reason.

The device is formed with a rounded handle 10 at right angles to which is cast the head 12 which is substantially oval in side view as shown in Figure 2, one end being rounded, as at 14, and the other end being formed as a blade or edge 15 which is intended to be sharpened. Across the lower face of the head and around the end 14 there are provided a plurality of parallel sharpened ribs or corrugations 16.

In use, the device is grasped by the handle 10 and used with short, vertical strokes, the force of which is greatly augmented by the weight of the implement. For certain classes of work the device may be grasped as a mallet and the corrugations about the end 14 used. In tendering the meat about the bone, or in similar restricted locations, the sharp edge 15 may be used. The whole device may be easily washed and will make a useful kitchen utensil.

What is claimed is:

A device for use in tendering meats, an integral cast metal body having a handle and a head at one end of the handle and at right angles thereto, the handle being located approximately centrally of the head, the head being substantially oval in cross-section with one end rounded and the other provided with a blade, and a plurality of sharpened corrugations formed over the face and the rounded end of the head.

FRED KNEIFEL.